United States Patent [19]

McGovern et al.

[11] 4,176,083
[45] Nov. 27, 1979

[54] SEPARATING FLUE GAS FROM REGENERATED CRACKING CATALYST

[75] Inventors: Stephen J. McGovern, Deptford; Klaus W. Schatz, Wenonah; Fred S. Zrinscak, Sr., Woodbury Heights, all of N.J.

[73] Assignee: Mobil Oil Corporation, New York, N.Y.

[21] Appl. No.: 937,035

[22] Filed: Aug. 25, 1978

[51] Int. Cl.$^2$ .......... B01J 21/20; B01J 29/38; C10G 13/18; B04C 3/06
[52] U.S. Cl. .................. 252/411 R; 55/261; 208/150; 208/164; 209/144; 252/417; 422/144; 422/147
[58] Field of Search ............. 252/417, 416, 411 R; 208/150, 151, 164

[56] References Cited

U.S. PATENT DOCUMENTS

| 2,408,943 | 10/1946 | Mekler | 208/150 |
| 2,981,695 | 4/1961 | Peery | 252/417 |
| 4,043,899 | 8/1977 | Anderson et al. | 208/164 |
| 4,071,436 | 1/1978 | Blanton, Jr. et al. | 208/120 |

*Primary Examiner*—P. E. Konopka
*Attorney, Agent, or Firm*—Charles A. Huggett; Raymond W. Barclay; Carl D. Farnsworth

[57] ABSTRACT

A stripper arrangement is provided in a regenerated catalyst standpipe for removing or displacing combustion flue gas products with fuel gas products of hydrocarbon conversion freed of hydrogen sulfide.

6 Claims, 2 Drawing Figures

Figure I
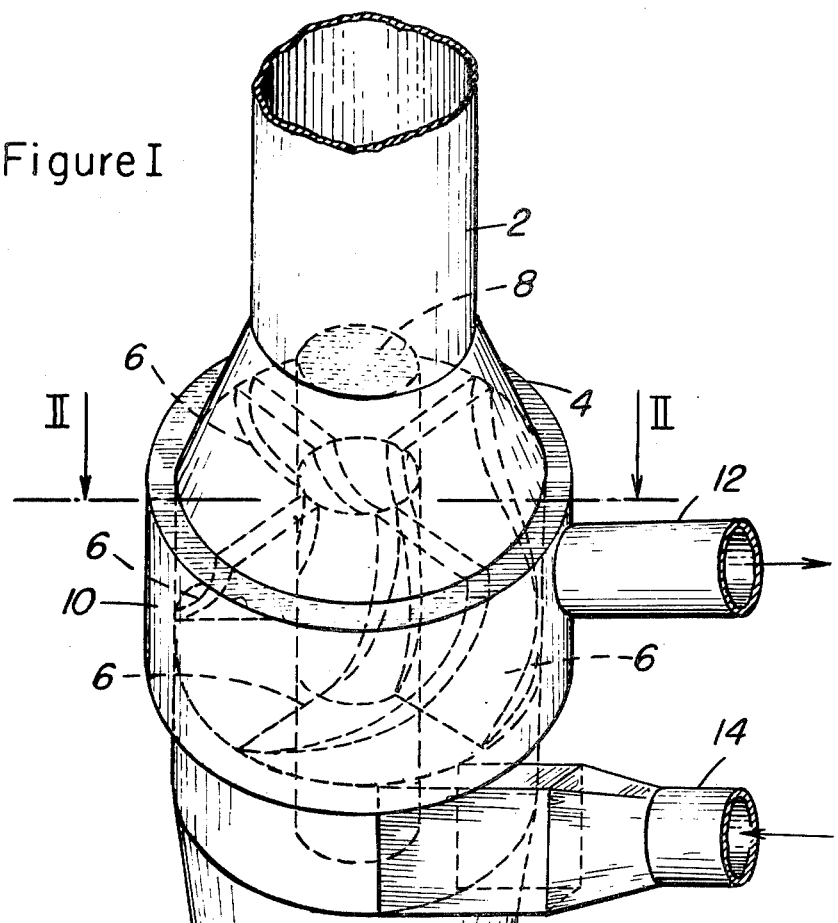
Figure II
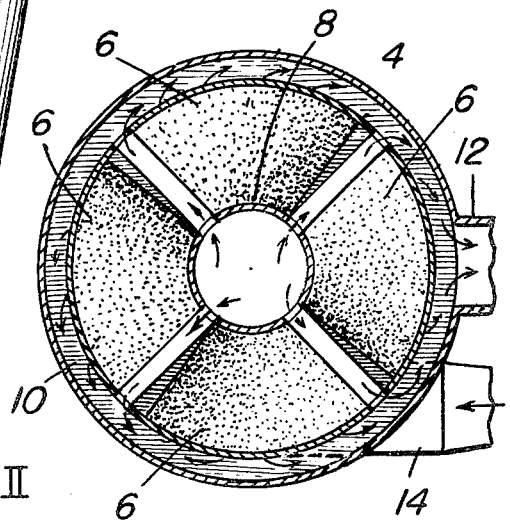

SEPARATING FLUE GAS FROM REGENERATED CRACKING CATALYST

BACKGROUND OF THE INVENTION

This invention relates to the cracking of hydrocarbons and the regeneration of catalyst used in the cracking operation. More particularly, the present invention is concerned with substantially reducing the amount of flue gas products, particularly $CO_2$ normally found in the off-gas product of a hydrocarbon conversion operation. Essentially, all of the $CO_2$ originates from the combustion of carbonaceous material in the catalyst regenerator in the form of flue gas and the $CO_2$ containing flue gas is entrained with catalyst particles transferred from the regeneration zone to the hydrocarbon conversion zone. The $CO_2$ containing flue gas thus transferred is thereafter recovered along with hydrogen sulfide and gaseous products of hydrocarbon conversion in the unsaturated gas plant amine absorber. Consequently, the hydrogen sulfide thus recovered contains as high as 20 to 30% or more of $CO_2$. This level of $CO_2$ is most undesirable and costly to remove. The present invention, therefore, is concerned with a method and means for removing $CO_2$ rich flue gases entrained with regenerated catalyst passed to a hydrocarbon conversion zone.

SUMMARY OF THE INVENTION

This invention relates to an improved method and means for displacing entrained gaseous products of combustion from regenerated cracking catalyst prior to use in hydrocarbon conversion. In a more particular aspect, the present invention is directed to the method and means for displacing entrained carbon dioxide ($CO_2$), and nitrogen ($N_2$) or any other entrained gaseous products of combustion from regenerated catalyst withdrawn from a catalyst regeneration zone by a standpipe and prior to passage and use thereof in a hydrocarbon conversion operation.

It has been found that modern-day catalyst regeneration operations are subject to entraining substantial amounts of $CO_2$ and $N_2$ or flue gas products of combustion with regenerated catalyst withdrawn from a catalyst regeneration zone as by a standpipe. By virtue of this entrainment, the $CO_2$ and other gases of combustion enter, for examle, into a riser cracking operation and subsequently are recovered with hydrogen sulfide ($H_2S$) in the refinery gas recovery plant. Under some conditions of operation, it has been found that the hydrogen sulfide product is contaminated with varying amounts of $CO_2$ and up to as much as 50 percent of carbon dioxide. This contamination level hurts the price obtainable for gas plant product, increases the costs of chemicals for the removal of $CO_2$ and, therefore, substantially increases the investment cost for a needed sulfur recovery plant. Thus, the use of $CO_2$, $N_2$ and flue gas product of catalyst regeneration as taught in the prior art as a stripping medium is not satisfactory. In addition, since modern-day refinery catalyst regeneration operations are operating at more elevated temperatures above 1150° F. and more usually at least about 1200° F. crystalline zeolite cracking catalyst, it has been found that steam is also an undesirable stripping medium since at the high catalyst recovery temperatures of about 1200° F. or more degrees, the steam deactivates the hot catalyst.

It has now been found, however, that a fuel gas product of the refinery cracking operation which has been separated from hydrogen sulfide and is available from the refinery gas plant is a relatively cheap material which is very suitable for use as a stripping medium to remove entrained $CO_2$ from hot regenerated catalyst. This fuel gas product does not have the adverse effects recognized above and discussed for $CO_2$, $N_2$ and steam. The fuel gas product separated from hydrogen-sulfide can be used to displace combustion product gases comprising $CO_2$ and thereafter the entrained fuel gas with the catalyst passed to the hydrocarbon conversion operation does not adversely effect the hydrocarbon conversion operation and does not reduce the heating value of the hydrocarbon conversion off-gas recovered from the conversion products. In some cases the fuel gas may even benefit the cracking operation by effecting some cooling and/or dilution of high boiling hydrocarbons being cracked. The fuel gas may also be used to partially cool the regenerated catalyst before it contacts the hydrocarbon to be converted.

The fuel gas product used as a stripping medium, according to this invention, in a fluidized catalyst operation comprising hydrocarbon conversion and catalyst regeneration may vary in composition depending upon the hydrocarbon material being processed and the severity of the cracking conditions employed. The table below identifies the composition of a typical fuel gas or off-gas separated in the fuel gas recovery plant with and without using fuel gas to purge and strip regenerated catalyst passing to the cracking operation. It will be observed from the table that when using a fuel gas purge of the regenerated catalyst, the composition of the fuel gas is improved and, more inportantly, the recovered fuel gas is free of inerts such as $CO_2$ and nitrogen.

| Composition, Vol. % | OFF-GAS ANALYSES | |
|---|---|---|
| | Without Fuel Gas Purge | With Fuel Gas Purge |
| Hydrogen | 14.2 | 16.1 |
| Methane | 35.5 | 40.3 |
| Ethene | 16.0 | 18.2 |
| Ethane | 18.9 | 21.4 |
| $C_3+$ | 3.5 | 4.0 |
| Inerts | 11.9 | — |
| | 100.0 | 100.0 |
| Molecular Weight | 21.0 | 20.0 |
| Gross Heating Value, Btu/cf | 1170 | 1330 |
| Rate, MCFM | 17.8 | 15.7 |

Thus, in a typical fluid catalytic cracking operation comprising, for example, a riser cracking operation, the products of hydrocarbon conversion are separated to recover a heavy fuel oil, a light fuel oil, gasoline boiling range material and a low boiling gaseous product fraction known as off-gas. This separated off-gas product is sent to purification or product-recovery facilities to separate and recover hydrogen sulfide from a desired fuel gas product as well as from higher boiling materials comprising $C_3$ to $C_5$ hydrocarbons. Thus, a fuel gas of the composition above-identified and comprising $C_3$ and lower boiling gaseous materials is readily available for use as a stripping medium and for displacing or purging the regenerated catalyst of flue gas product of combustion as herein described. Some of the recovered fuel gas may be employed to strip catalyst recovered from the hydrocarbon conversion step. However, since this stripping of spent catalyst is accomplished at a temperature normally below 1000° F., the effect of steam on catalyst activity during this lower temperature stripping operation is substantially less detrimental to maintaining the catalyst activity. The catalyst stripped of entrained hydrocarbons but containing carbonaceous deposits of the hydrocarbon conversion operation is then passed to a catalyst regeneration operation. The catalyst regeneration operation may be a conventional dense fluid bed catalyst regeneration operation provided with a more dispersed phase of catalyst thereabove or the more mordern upflow catalyst regeneration arrangement represented by U.S. Pat. No. 3,926,778 and U.S. Pat. No. 4,035,284 incorporated herein by reference thereto which may also be employed. In any of these arrangements, regenerated catalyst at an elevated temperature of at least 1150° F. and more usually within the range of 1200° to 1500° F. is recovered and transferred by a standpipe to the bottom portion of one or more riser cracking zones wherein the catalyst is mixed with the hydrocarbon charge to form a suspension at elevated temperature cracking conditions. The formed suspension is passed up through the riser at a temperature of at least 950° F. and more usually the suspension temperature will be at least 980° F. or 1000° F.

In accordance with this invention, the hot regenerated catalyst withdrawn by the regenerator catalyst standpipe is purged or stripped with fuel gas preheated to a desired elevated temperature to displace entrained products of combustion such as $CO_2$ and $N_2$ with the fuel gas. The drawing, FIG. I, identifies one arrangement of apparatus for effecting the stripping of the hot regenerated catalyst with heated fuel gas prior to passing the regenerated catalyst at a desired elevated temperature to hydrocarbon conversion. In the apparatus arrangement of FIG. I, the hot regenerated catalyst in standpipe 2 is passed downwardly through a first annular zone 4 provided with downwardly sloping stator blades 6 which impose a horizontal circulating moment on the downwardly flowing stream of catalyst in the annular zone, thereby causing the particles of catalyst to move to the outer wall of the first annular section 4 with the inert gaseous components comprising $CO_2$ and $N_2$ collecting along the inner wall of the first annular section formed by tube 8. The inner wall of the first annular zone or section is formed by a coaxially positioned tube 8 extending through the annular zone 4. Tube 8 is closed at its upper end and is open at its bottom end.

A second annular zone 10 closed at the top and bottom thereof is positioned about said first annular zone. The stator blades positioned in said first annular zone are closed on the top edge thereof but are hollow to permit and confine cross-flow passage of gaseous material from within said tube 8 through said hollow stator blades 6 into the second annular zone 10. Conduit means 12 are provided for withdrawing gaseous material from said second annular zone 10 and conduit means 14 is provided for tangentially or otherwise introducing stripping gas (fuel gas) at a desired elevated temperature to a bottom portion of said first annular zone and about the lower portion of said coaxially positioned tube 8 for admixture with circulating catalyst particles and passage therethrough with displaced flue gas products into the bottom open end of said coaxially positioned tube 8. Flue gas displaced with fuel gas is then passed from within tube 8 through said hollow stator blades into said second annular zone to withdrawal conduit 12. By this arrangement of apparatus and contact between regenerated catalyst and fuel gas, the inerts or flue gas comprising $CO_2$ and $N_2$ are displaced or removed by the introduced fuel gas and the introduced fuel gas then becomes the gas entrained with the hot regenerated catalyst particles into the hydrocarbon conversion zone. The regenerated catalyst thus stripped of flue gas and at a desired elevated temperature passes downwardly through conical section 16 into the regenerated catalyst standpipe 18 for transfer to a hydrocarbon conversion zone such as a riser conversion zone not shown.

In the arrangement of the drawings, FIGS. I and II, FIG. II being a cross-section of FIG. I at II, there are four hollow stator blades shown which are closed at the top and bottom edge thereof. The blades are spaced uniformly within the first annular zone from one another. Of course, there could be more or less than 4 of the stator blades shown. Furthermore, the stator blades could be sloped differently than shown to provide surfaces more or less curved than shown in the drawing. In any event, whatever configuration of stator blades is employed, it is desirable in this arrangement that the stator blades be hollow to permit the cross-flow of gases from within tube 8 to the outer second annular zone 10 and withdrawal therefrom by conduit 12. In yet another embodiment, it is contemplated withdrawing the gases from the top of the coaxially positioned tube 8 in which case the stator blades need not be hollow and the second annular zone is not required. Other arrangements which accomplish the displacement of inert combustion gas products with fuel gas from regenerated catalyst will be obvious to those skilled in the art and may be employed without departing from the concepts of the present invention. For example, the catalyst may be stripped in a riser arrangement or in a separate dense fluid bed of catalyst with the fuel gas to displace undesired $CO_2$ and $N_2$ before passage of the catalyst to the riser hydrocarbon conversion zone. Also, any cooling of the catalyst during displacement of the $CO_2$ containing flue gases will be a function of the difference in temperature of the hot regenerated catalyst and the temperature of the suspension desired in a riser cracking operation not shown. This temperature difference can vary considerably between cracking operations.

In any of the arrangements employed, it is preferred that the stripping of the regenerated catalyst with fuel gas be accomplished adjacent the inlet of catalyst to the regenerated catalyst standpipe so that the catalyst separated from undesired combustion product gases can develop a pressure head suitable for discharge into the bottom of the downstream hydrocarbon conversion zone.

Having thus generally described the method and means of the present invention and described a specific embodiment in support thereof, it is to be understood that no undue restrictions are to be imposed by reason thereof except as defined by the following claims.

We claim:

1. In a process for stripping hot regenerated catalyst with a fuel gas before passage to a hydrocarbon conversion operation, the improved method of stripping which comprises, passing hot regenerated catalyst with entrained $CO_2$ containing flue gas downwardly as a confined stream into a zone imparting a centrifugal annular catalyst flow to said downwardly flowing confined stream about a centrally positioned zone closed at its upper end but open in the bottom end thereof, contacting said annular flowing catalyst stream with fuel gas and displacing $CO_2$ from the catalyst, withdrawing fuel gas with displaced $CO_2$ into said centrally postioned zone for withdrawal from the stripping operation, and withdrawing regenerated catalyst displaced from $CO_2$ from beneath said centrally positioned zone for transfer to a hydrocarbon conversion zone.

2. The method of claim 1 wherein the fuel gas has been separated from hydrogen sulfide before displacing said flue gas.

3. The method of claim 1 wherein the fuel gas comprises $C_3$ and lower boiling component of a hydrocarbon cracking operation.

4. The method of claim 1 wherein the displacement of flue gas with fuel gas is accomplished without undesired temperature reduction of the regenerated catalyst.

5. The method of claim 1 wherein the displacement of flue gas with fuel gas is accomplished by passing the fuel gas through a horizontally circulating annular confined stream of catalyst into said centrally positioned zone.

6. The process of claim 1 wherein the annular catalyst flow is in a zone about the centrally positioned zone, hollow sloping baffles in said annular passageway provide open communication between said central zone and a separate confined annular zone about said annular flowing catalyst stream and fuel gas with displaced $CO_2$ is withdrawn from said central zone through said hollow baffles into said separate confined annular zone for withdrawal therefrom.

* * * * *